United States Patent [19]
Ejima

[11] Patent Number: 5,873,618
[45] Date of Patent: Feb. 23, 1999

[54] STRUCTURE FOR UPPER BODY SECTION OF VEHICLE BODY

[75] Inventor: Katsumi Ejima, Hiroshima, Japan

[73] Assignee: Mazda Motor Corporation, Hiroshima, Japan

[21] Appl. No.: 715,348

[22] Filed: Sep. 18, 1996

[30] Foreign Application Priority Data

Sep. 18, 1995 [JP] Japan ................................. 7-264808

[51] Int. Cl.⁶ ................................................ B62D 27/20
[52] U.S. Cl. ............................................................ 296/30
[58] Field of Search ............................... 296/30, 1.1, 185, 296/187, 193, 202, 203.01, 203.03, 29

[56] References Cited

U.S. PATENT DOCUMENTS 5,213,386   5/1993   Janotik et al. ............................ 296/30
5,567,005  10/1996   Kosusge et al. ......................... 296/30

FOREIGN PATENT DOCUMENTS 857637   9/1940   France ..................................... 296/30
1-57967  4/1989   Japan .

Primary Examiner—Stephen Avila
Attorney, Agent, or Firm—Martin Fleit

[57] ABSTRACT

An upper body section of a vehicle body of the type having a generally U-shaped roof side gutter, interposed between a roof and a body side frame and stretching the full length of the roof, has a structure comprising a gutter rail formed by an inside half of the gutter rail integrally formed with a roof panel and an outside half of the gutter rail integrally formed with a side frame panel. A roof reinforcement beam is laid so as to extend between center pillars and is secured to the roof panel. A corner gusset extends across the gutter rail, overlaps both the center pillar and the roof reinforcement beam, and is secured to both the center pillar and the roof reinforcement beam.

8 Claims, 7 Drawing Sheets ures for uPPER BODY SECTION OF VEHICLE BODY

BACKGROUND OF THE INVENTION

1. Field of the Invention

The present invention relates to a structure for an upper body section of a vehicle body of the type having a generally U-shaped roof side gutter extending in the lengthwise direction of the vehicle body along each side of a roof panel to which an upper body side frame is secured.

2. Description of Related Art

Some types of vehicle bodies have upper body sections having a structure in which a generally U-shaped roof side gutter, opening upward, is interposed between a roof and each side frame. This generally U-shaped roof side gutter is defined by a U-shaped gutter rail comprising an inside half of gutter rail integrally formed with a roof panel and an outside half of gutter rail integrally formed with a side frame panel. Such an upper body section is reinforced by a roof reinforcement beam extending in a transverse direction of the vehicle body between left and right center pillars and secured to the roof panel. The inside half of the gutter rail is laid to overlap the outside half of the gutter rail and located on the inner side of an inside pillar member of the center pillar.

In vehicle bodies having upper body sections of the type having no roof side gutter structure, as shown in Japanese Unexamined Utility Model Publication No. 1-57967, there is provided a roof side rail, extending along a top end of the upper body section, to which a roof panel, a roof reinforcement beam and a center pillar are secured. The roof side rail, at a section where an end of the roof reinforcement beam is connected, is covered by inner and outer brace members to form a closed cross section.

In the event of a lateral or "flank" collision, the energy of an impact reaches a center pillar via the side body. If the center pillar and a body section surrounding the center pillar do not have a sufficient structural strength or rigidity, then it is hard to prevent the vehicle body from deformation of the center pillar which can possibly injure a passenger in the event of a flank collision. In vehicle bodies of the type having a U-shaped roof side gutter, stress due to the energy of an impact caused upon a flank collision concentrates at the roof side gutter before the energy reaches the roof reinforcement through the center pillar. Because the roof side gutter is formed by two separate gutter rail sections, namely inside and outside halves of gutter rail sections, deformation of the center pillar due to a flank collision is enhanced.

SUMMARY OF THE INVENTION

It is an object of the present invention to provide a simple structure for an upper body section of a vehicle body of the type having a U-shaped roof side gutter which can suppress deformation of a center pillar in the event of a flank collision.

The aforesaid object of the present invention is achieved by providing a structure for an upper body section of a vehicle body of the type having a generally U-shaped roof side gutter stretching the full length of the roof and interposed between a roof and each side frame which includes a center pillar located inside of each side frame and a roof reinforcement beam laid to extend between the center pillars and secured to the roof panel. The generally U-shaped roof side gutter is formed by an inside half of the gutter fail integrally formed with a roof panel and an outside half of the gutter rail integrally formed with a side frame panel. A corner gusset is laid between the roof panel and side frame panel to extend across each roof side gutter and overlap both the center pillar and the roof reinforcement beam and is secured to both center pillar and roof reinforcement beam.

Enhanced protection is provided by the roof corner gusset incorporated to transmit the energy of an impact to the roof panel via the center pillar and thereby prevent stress concentration at the roof side gutter which causes significant deformation of the center pillar.

The corner gusset is formed to have a generally U-shaped cross section stretching almost its full length and secured to the center pillar at a position where the inside half of the gutter rail and the inside center pillar member meet together. This structure forms a closed cross section in the section between the roof reinforcement beam and the center pillar, providing an improvement in structural strength of the upper body section.

The corner gusset is preferably secured to both the roof reinforcement beam and the center pillar with fasteners such as bolts and rivets. The utilization of such fasteners makes it easy to secure the corner gusset to the roof reinforcement beam after securing the roof reinforcement beam to the roof panel.

The roof reinforcement beam may be formed to have a generally U-shaped cross section stretching almost its full length so as to provide a closed cross section when secured to the roof panel. The upper body structure, incorporating the U-shaped roof reinforcement beam, provides an improvement in structural strength and enhanced prevention of deformation of the center pillar.

BRIEF DESCRIPTION OF THE DRAWINGS

The above and other objects and features of the present invention will be clearly understood from the following description of preferred embodiments thereof when considered in conjunction with the accompanying drawings, in which.

DETAILED DESCRIPTION OF THE PREFERRED EMBODIMENTS

Figure 1:
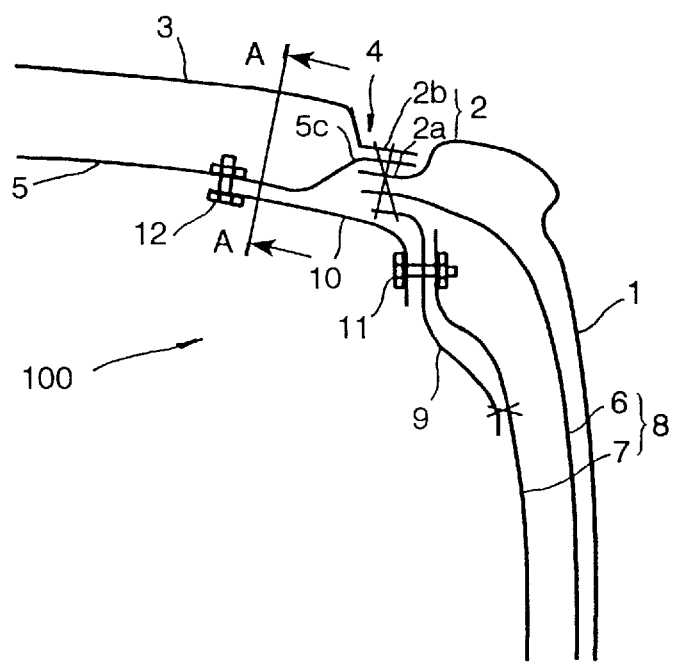
FIG. 1 is a schematic illustration showing an upper body structure according to a specific embodiment of the invention in cross section.
Figure 2:
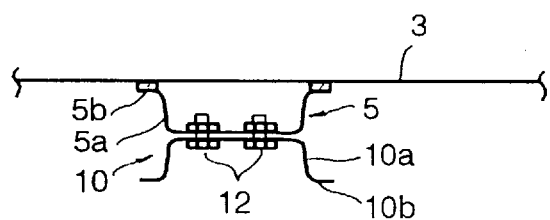
FIG. 2 is a cross sectional view of the upper body structure taken along line A—A of FIG. 1.
Figure 3:
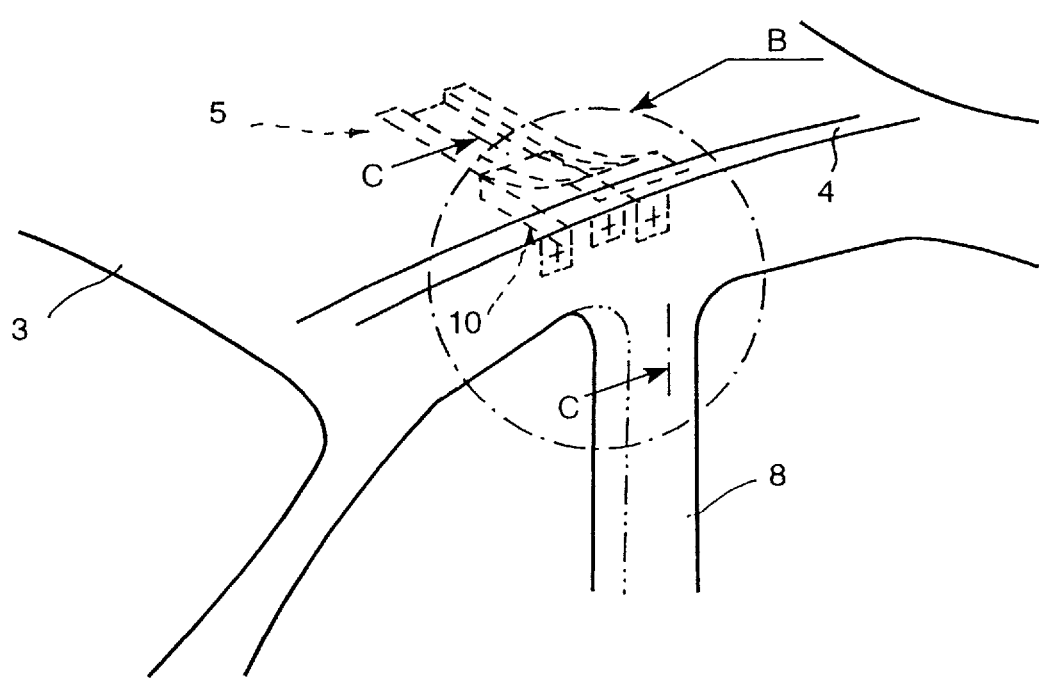
FIG. 3 is a perspective view showing an outer appearance of the upper body structure.

Parts which are not of direct importance to the invention and parts which are purely of conventional construction will not be described in detail. For example, the lower body section and its associated elements which are necessary for the vehicle body will not be set out in detail since their construction can easily be arrived at by a person skilled in the art.

Referring to the drawings in detail, and in particular to FIGS. 1 through 5 showing part of an upper body section 100 of a vehicle body including a roof and an upper side frame, the upper body section 100 is formed with a roof side groove or roof side gutter 4 defined by a generally U-shaped gutter rail 2 opening upward between a roof panel 3 and an upper side frame panel 1. The roof panel 3 has an outside generally L-shaped gutter rail section 2b integrally formed therewith which stretches approximately the full length of the roof panel 3. The upper side frame panel 1 has an inside generally L-shaped gutter rail section 2a integrally formed therewith which stretches along the side of the roof panel 3. These inside and outside gutter rail sections 2a and 2b, which form halves of the generally U-shaped gutter rail 2, are welded, or otherwise secured, to each other to connect the side frame panel 1 and roof panel 3 with the roof-side gutter 4 interposed therebetween.

The upper body section 100 includes center pillars 8 and a generally U-shaped roof reinforcement beam 5. The center pillar 8 comprises outside and inside pillar panels 6 and 7 and extends vertically to the roof panel 3 on an inner side of and adjacent to each side frame panel 1. The roof reinforcement beam 5 extends in transverse direction of the roof panel 3 between upper ends of the center pillars 8. A gutter rail reinforcement strip 9 extends in lengthwise direction of the vehicle body along the gutter rail 2 and is incorporated between the gutter rail 2 and the center pillar 8. Further, a generally U-shaped corner gusset 10 is provided between the roof reinforcement beam 5 and the gutter rail reinforcement strip 9 to extend across over the gutter rail 2. As shown in FIG. 1, one end of the roof reinforcement beam 5 is interposed between and welded, or otherwise secured, to the inside and outside gutter rail sections 2a and 2b. Further, ends of the outside center pillar panel 6 and the gutter rail reinforcement strip 9 at their upper portions are laid to overlap each other and welded, or otherwise secured, to each other. After welding the outside center pillar panel 6 and the gutter rail reinforcement strip 9, they are welded, or otherwise secured, to the under surface of the gutter rail 2. First ends of the inside pillar panel 7 and the corner gusset 10 are laid to overlap the gutter rail reinforcement strip 9 and secured together with a fastening bolt 11, or otherwise secured together, to the gutter rail reinforcement strip 9. The gutter rail reinforcement strip 9 at another end, namely the lower end, is welded, or otherwise secured, to the inside center pillar panel 7. Accordingly, the gutter rail reinforcement strip 9 is secured to the inside center pillar panel 7 at two, namely upper and lower, positions. The corner gusset 10 at another end, namely its inner end, is secured with a bolt 12, or otherwise secured, to the roof reinforcement beam 5.

Figure 4:
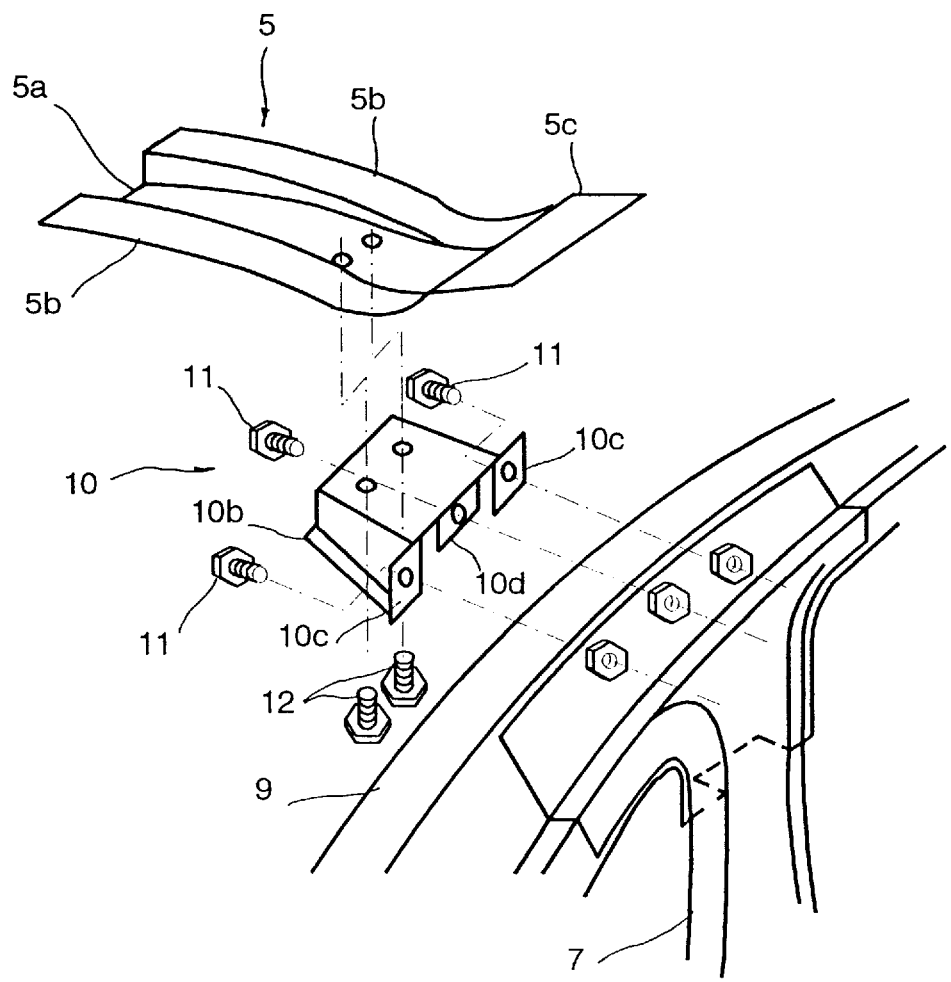
FIG. 4 is an enlarged, exploded perspective view showing details of a circled section B of FIG. 3.

As shown in detail in FIG. 4, the roof reinforcement beam 5 comprises a major middle section 5a having a generally U-shaped cross section, a side flange 5b extending along each top edge of the middle section 5a and a flat end section 5c at each end thereof which are formed as an integral beam. The middle section 5a and both side flanges 5b at their ends are shaped even with the flat end section 5c. This generally U-shaped roof reinforcement beam 5 is laid to open upward, and bonded at the side flanges 5b to the roof panel 3. As was previously described, the roof reinforcement beam 5 at the flat end section 5c is interposed between and welded, or otherwise secured, to the inside and outside gutter rail sections 2a and 2b.

Generally U-shaped corner gusset 10 comprises a major section 10a having a generally U-shaped cross section opening downward side flanges 10b integrally formed with and stretching the full length of the major section 10a, and end flanges 10c and 10d integrally formed with and extending downward from an outer end of the major section 10a. The major section 10a is gradually expanded in width and height from its inner end at which the corner gusset 10 is bolted to the roof reinforcement beam 5 to its outer end at which the corner gusset 10 is bolted to the gutter rail reinforcement strip 9. Each end flange 10c extends laterally outward from the outer edge of the major section 10a. The end flange 10d is positioned at the middle of the end opening and extends downward from the outer edge of the major section 10a. The corner gusset 10 is formed with fastener holes 10e in the major section 10a and the respective end flanges 10c and 10d as seen in FIGS. 4 and 5 through which fastening bolts 11 and 12 are inserted.

Roof reinforcement beam 5 and gutter rail reinforcement strip 9 shown in FIGS. 1 through 4 may be interconnected in various different ways as shown in FIG. 6(A) through 6(E).

Figure 6A:
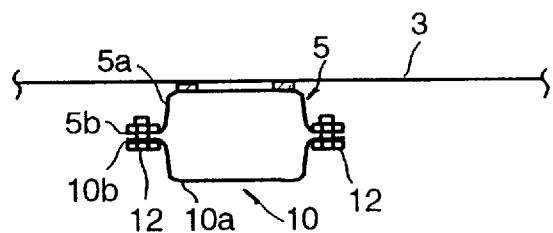
FIG. 6(A) to 6(E) are cross sectional views showing variations of the upper body structure taken along line A—A of FIG. 1.

Referring to FIG. 6(A), schematically showing a structure for interconnecting a roof reinforcement beam and a gutter rail reinforcement strip, a generally U-shaped roof reinforcement beam 5 is the same in structure as that shown in FIG. 4 but is, however, laid to open downward with respect to the roof panel 3 and secured at the back thereof directly to the roof panel 3. As shown in detail in FIG. 7, a generally U-shaped corner gusset 10 for interconnecting the roof reinforcement beam 5 and the gutter rail reinforcement strip 9 comprises a major section 10a having a generally U-shaped cross section opening upward, side flanges 10b integrally formed with and stretching the full length of the major section 10a, and end flanges 10c and 10d integrally formed with an outer end of the major section 10a. The major section 10a is gradually expanded in width and height from its inner end at which the corner gusset 10 is bolted to the roof reinforcement beam 5 to its outer end at which the corner gusset 10 is bolted to the gutter rail reinforcement strip 9. Each side flange 10b is formed with a fastener hole 10e. Each end flange 10c extends laterally outward from the outer edge of the major section 10a and formed with a fastener hole 10e. The end flange 10d is positioned at the middle of the end opening and extends downward from the outer edge of the major section 10a and is formed with a fastener hole 10e. The corner gusset 10 is laid so that the side flanges 10b stand face to face with the side flanges 5b of the roof reinforcement beam 5, respectively. The roof reinforcement beam 5 and the corner gusset 10 are interconnected by securing their side flanges 5b and 10b by fastening bolts 12.

Figure 5:
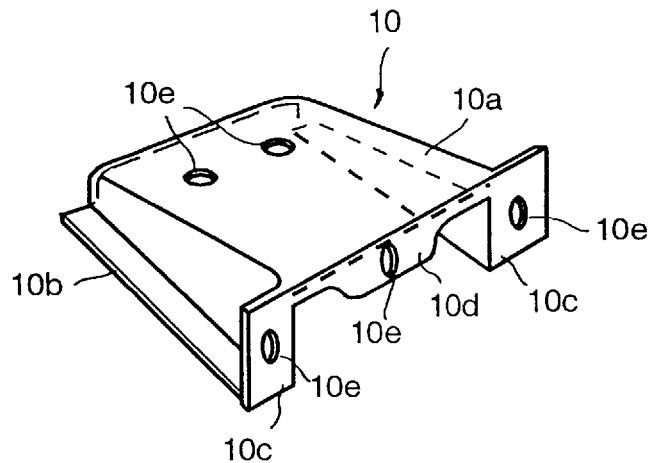
FIG. 5 is an enlarged perspective view showing a corner gusset incorporated in the upper body structure shown in FIG. 1.
Figure 6B:
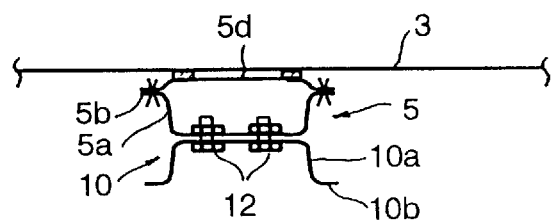

FIG. 6(B) schematically shows a structure for interconnecting a roof reinforcement beam and a gutter rail reinforcement strip by a corner gusset which is the same in structure as that shown in FIGS. 4 and 5. A generally U-shaped roof reinforcement beam 5 is the same in structure as that shown in FIGS. 4 and 5 but is, however, secured to the roof panel 3 by flanged cap type of cover member 5d. The cover member 5d having a shallow U-shaped cross section is laid to open downward and welded, or otherwise secured, to the roof panel 3. The generally U-shaped roof reinforcement beam 5 is laid to open upward and welded, or otherwise secured, at side flanges 5b to the cover member 5d so as to provide a closed cross section therebetween. A generally U-shaped corner gusset 10 is laid to open downward and to overlap back to back with the roof reinforcement beam 5 and secured with fastening bolts 12, or otherwise secured, to the roof reinforcement beam 5.

Figure 6C:
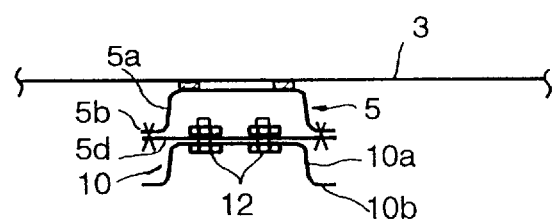

FIG. 6(C) schematically shows a structure for interconnecting a roof reinforcement beam and a gutter rail reinforcement strip by a corner gusset. In this structure, a roof reinforcement beam 5 having the same structure as that shown in FIG. 6(A) and a flat plate type of cover member 5d are employed to form a closed cross section therebetween. A flat plate cover member 5d is welded, or otherwise secured, to the side flanges 5b of a generally U-shaped roof reinforcement beam 5 such as shown in FIGS. 4 and 5 so as to provide a closed cross section therebetween. The roof reinforcement beam 5 bottomed by the flat plate cover member 5d is laid with the cover member 5d faced to the roof panel 3 and welded, or otherwise secured, directly to the roof panel 3. A generally U-shaped corner gusset 10 at its major section 10a is laid to open downward and secured with fastening bolts 12, or otherwise secured, to the cover member 5d.

Figure 7:
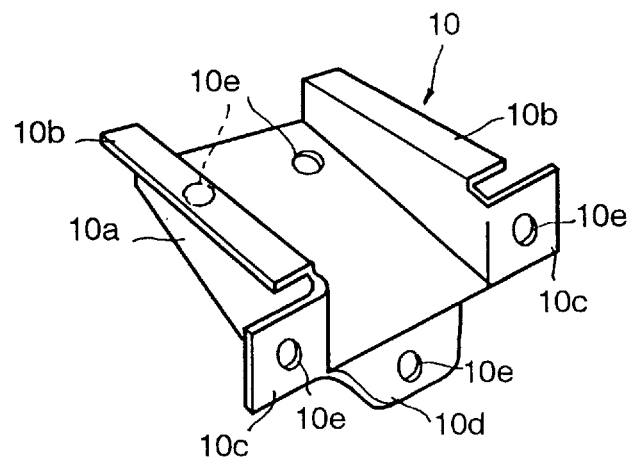
FIG. 7 is an enlarged perspective view showing another corner gusset.
Figure 6D:
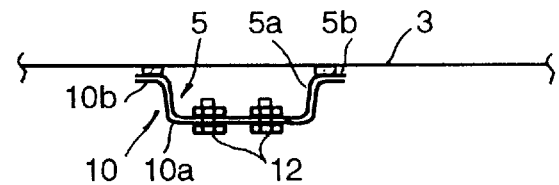

FIG. 6(D) schematically shows a structure for interconnecting a roof reinforcement beam and a gutter rail reinforcement strip by a corner gusset in which utilization is made of a generally U-shaped roof reinforcement beam 5 which is the same in structure as that shown in FIG. 4 and a generally U-shaped corner gusset 10 which is the same in structure as that shown in FIG. 7. The roof reinforcement beam 5 is laid to open upward and welded, or otherwise secured, directly to the roof panel 3. The corner gusset 10 is laid to open upward and overlaps and fits at the inner end of the major section 10a to the roof reinforcement beam 5. The major sections 5a and 10a of the roof reinforcement beam 5 and the corner gusset 10 thus fitted to each other are secured with fastening bolts 12.

Figure 6E:
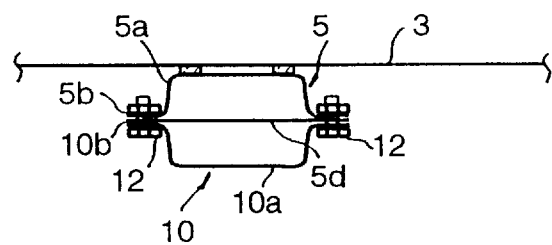

FIG. 6(E) schematically shows a structure for interconnecting a roof reinforcement beam and a gutter rail reinforcement strip by a corner gusset. In this structure, a roof reinforcement beam 5 having the same structure as that shown in FIG. 4 and a flat plate type of cover member 5d are employed to form a closed cross section therebetween. A generally U-shaped roof reinforcement beam 5 is laid upside down so as to open downward and welded, or otherwise secured, directly to the roof panel 3. A generally U-shaped corner gusset 10, which is the same in structure as that shown in FIG. 7, is laid to open upward and secured with fastening bolts 12 to the roof reinforcement beam 5 with a flat plate cover member 5d interposed between side flanges 5a and 10a.

Figure 8:
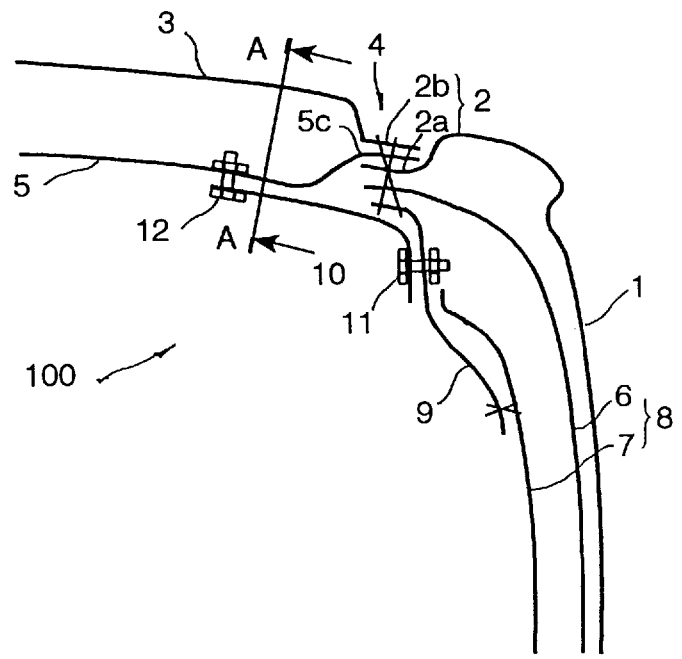
FIG. 8 is a schematic illustration showing an upper body structure according to another specific embodiment of the invention in cross section.

Generally U-shaped corner gusset 10 shown in FIG. 5 or FIG. 7 may be secured with fastening bolts 11 only to the gutter rail reinforcement strip 9 as shown in FIG. 8. In this instance, the gutter rail reinforcement strip 9 is secured to the inside center pillar panel 7 at only one, or lower, position.

Figure 9:
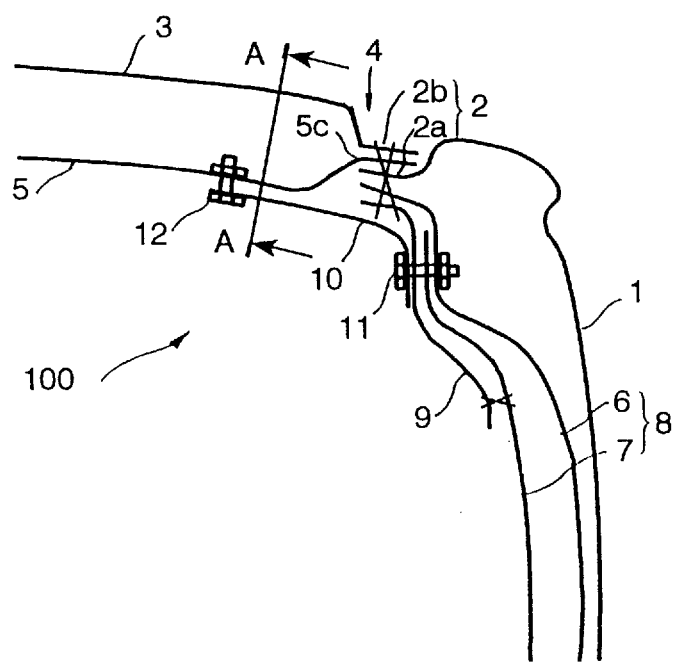
FIG. 9 is a schematic illustration showing an upper body structure according to another specific embodiment of the invention in cross section.

Alternatively, the gutter rail reinforcement strip 9 and the outside and inside pillar panels 6 and 7 may be shaped to overlap all together as shown in FIG. 9. A generally U-shaped corner gusset 10 shown in FIG. 5 or FIG. 7 is secured with fastening bolts 11 to the overlapped section of the gutter rail reinforcement strip 9 and outside and inside pillar panels 6 and 7. In this instance, the gutter rail reinforcement strip 9 is secured to the inside center pillar panel 7 at two, or upper and lower, positions.

Figure 10:
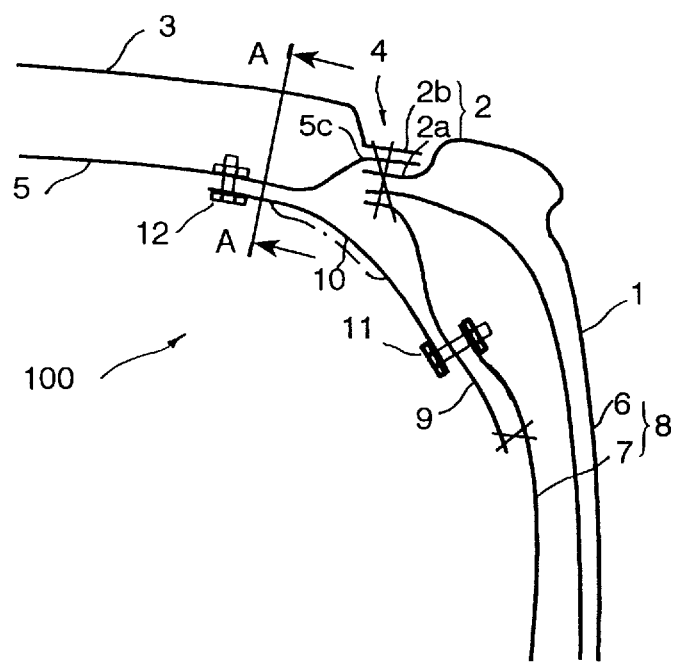
FIG. 10 is a schematic illustration showing an upper body structure according to still another specific embodiment of the invention in cross section.
Figure 11:
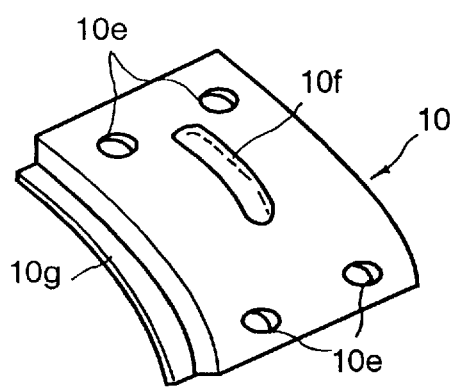
FIG. 11 is an enlarged perspective view showing another corner gusset incorporated in the upper body structure shown in FIG. 10.

FIG. 10 shows a structure for interconnecting a roof reinforcement beam and a gutter rail reinforcement strip by a corner gusset in which utilization is made of a generally U-shaped roof reinforcement beam 5, which is the same in structure as that shown in FIG. 4, and a corner gusset 10 shown in FIG. 11. This structure is advantageously embodied in, in particular, a vehicle body which has the contours of an upper body section 100 with a gently curving corner between a roof and a side frame. The upper body section 100 is the same in structure as that shown in FIG. 1 except that the corner, including a generally U-shaped gutter rail 2 between a roof panel 3 and a side frame panel 1, is generally gently curved.

As shown in FIG. 11, the corner gusset 10, by which the roof reinforcement beam 5 and a gutter rail reinforcement strip 9 are interconnected to each other, comprises a curved major section 10a having a relatively thick wall and a thin side flange 10g extending along each side of the major section 10a. The corner gusset 10 is formed with fastener holes 10e in close proximity to each end of the major section 10a and an elongated bead 10f at a central section of the major section 10a. The corner gusset 10, thus shaped, is secured with fastening bolts 11 and 12 to both roof reinforcement beam 5 and gutter rail reinforcement strip 9, so as thereby to interconnect them.

Corner gusset 10 used in each embodiment described above may be secured to the roof reinforcement beam 5 and/or at least the gutter rail reinforcement strip 9 with rivets or by means of welding as well as with fastening bolts.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A structure for an upper body section of a vehicle body comprising:

a) an elongated roof panel having opposed longitudinally sides;
   b) side frames each having a top and a bottom disposed at said opposed longitudinally extending sides of said roof panel with the tops lying in proximity with the opposed longitudinally sides;
   c) each said side frame having a center pillar located on the inner side of said side frame;
   d) a generally U-shaped gutter rail extending over the full length of the roof and at each of said opposed sides to form roof side gutters opening upwardly between said roof panel and said side frames, each said gutter rail comprised of an inside half of the gutter rail integrally formed with one opposed side of said roof panel overlapped and connected with an outside half of the gutter rail integrally formed with the top of said side frame lying in proximity with the said one opposed side of the roof panel;
   e) a roof reinforcement beam having opposite ends extending underneath and across said roof panel between said center pillars and being secured to said gutter rails at said opposite ends thereof and being secured intermediately to an undersurface of the roof panel between said opposite ends;

f) a pair of corner gussets, each having a generally U-shaped cross section and opposed ends, each corner gusset being located inside one of said side frames and under said roof panel and extending transversely across beneath one of said U-shaped gutter rails; and g) one end of each said U-shaped corner gusset being secured by a fastening member to said roof reinforcement beam and the other end of said U-shaped corner gusset being secured by a fastening member to said center pillar to interconnect said roof reinforcement beam to said center pillars.

2. A structure for an upper body section of a vehicle body as defined in claim 1, wherein said roof reinforcement beam and said roof panel form a continuous closed space between securing positions of said roof reinforcement beam to said corner gussets.

3. A structure for an upper body section of a vehicle body as defined in claim 1, wherein said center pillar comprises an inside pillar member and an outside pillar member, and said U-shaped corner gusset is secured to said center pillar at a location where said gutter rail reinforcement and said inside pillar member meet together.

4. A structure for an upper body section of a vehicle body as defined in claim 3, wherein said U-shaped corner gusset forms a continuous generally rectangular cross section between securing positions of said U-shaped corner gusset to said roof reinforcement beam and said center pillar.

5. A structure for an upper body section of a vehicle body comprising a roof panel, side frames disposed at opposite sides of said roof panel which include a center pillar comprising an inside pillar member and an outside pillar member located on an inner side of each said side frame, a generally U-shaped gutter rail comprising an inside half of a gutter rail member integrally formed with said roof panel and an outside half of a gutter rail member integrally formed with each said side frame, both of which extend over a full length of said roof panel, to form a roof side gutter opening upward between said roof panel and each said side frame, a roof reinforcement beam extending between the center pillars and secured to said gutter rails at opposite ends thereof and to an under surface of said roof panel between said opposite ends, a gutter rail reinforcement extending on an inner side of the said inside pillar member and below said outside half of the gutter rail, and a corner gusset having a generally U-shaped cross section spaced below said gutter rail, said U-shaped corner gusset extending across over each said gutter rail and being secured at its outer end to said gutter rail reinforcement in a position where said gutter rail reinforcement is located below said outside half of the gutter rail and on the inner side of said inside pillar member.

6. A structure for an upper body section of a vehicle body comprising a roof panel, side frames disposed at opposite sides of said roof panel and including a center pillar comprising an inside pillar member and an outside pillar member and located on an inner side of each said side frame, a generally U-shaped gutter rail comprising an inside half of a gutter rail member integrally formed with said roof panel and an outside half of a gutter rail member integrally formed with each said side frame, both of which extend over a full length of said roof panel, to form a roof side gutter opening upward between said roof panel and each said side frame, a roof reinforcement beam extending between the center pillars and secured to said gutter rails at opposite ends thereof and to an under surface of said roof panel between said opposite ends, a gutter rail reinforcement extending on an inner side of the said inside pillar member and below said outside half of the gutter rail, and a corner gusset having a generally U-shaped cross section spaced below said gutter rail, said U-shaped corner gusset extending across over each said gutter rail and being secured at its outer end to both said gutter rail reinforcement and said inside pillar member in a position where said gutter rail reinforcement and said inside pillar member meet together.

7. A structure for an upper body section of a vehicle body comprising, a roof panel, side frames disposed at opposite sides of said roof panel which include a center pillar comprising an inside pillar member and an outside pillar member and located on an inner side of each said side frame, a generally U-shaped gutter rail comprising an inside half of a gutter rail member integrally formed with said roof panel and an outside half of a gutter rail member integrally formed with each said side frame, both of which extend over a full length of said roof panel, to form a roof side gutter opening upward between said roof panel and each said side frame, a roof reinforcement beam extending between the center pillars and secured to said gutter rails at opposite ends thereof and to an under surface of said roof panel between said opposite ends, a gutter rail reinforcement extending on an inner side of the said inside pillar member and below said outside half of the gutter rail, and a corner gusset having a generally U-shaped cross section to provide a space below said gutter rail, said U-shaped corner gusset extending across over each said gutter rail and being secured at its outer end to all of said gutter rail reinforcement, said inside pillar member and said outside pillar member in a position where said gutter rail reinforcement and said inside pillar member meet together.

8. A structure for an upper body section of a vehicle body as defined in claim 7, wherein said roof reinforcement beam has a closed cross section continuous at least between securing positions of said roof reinforcement beam to said corner gussets.

* * * * *